United States Patent
Baldoni et al.

(10) Patent No.: US 11,181,161 B2
(45) Date of Patent: Nov. 23, 2021

(54) SHOCK ABSORBER BASE VALVE ASSEMBLY

(71) Applicant: DRiV Automotive Inc., Southfield, MI (US)

(72) Inventors: Frederik Baldoni, Borgloon (BE); Wim Knevels, Genk (BE)

(73) Assignee: DRiV Automotive Inc., Southfield, MI (US)

( * ) Notice: Subject to any disclaimer, the term of this patent is extended or adjusted under 35 U.S.C. 154(b) by 81 days.

(21) Appl. No.: 16/578,578

(22) Filed: Sep. 23, 2019

(65) Prior Publication Data

US 2021/0088096 A1 Mar. 25, 2021

(51) Int. Cl.
*F16F 9/19* (2006.01)
*F16F 9/49* (2006.01)
*F16F 9/512* (2006.01)

(52) U.S. Cl.
CPC .............. *F16F 9/19* (2013.01); *F16F 9/49* (2013.01); *F16F 9/5126* (2013.01)

(58) Field of Classification Search
CPC ............. F16F 9/19; F16F 9/49; F16F 9/5126
See application file for complete search history.

(56) References Cited

U.S. PATENT DOCUMENTS

| | | | |
|---|---|---|---|
| 2,729,308 A | 1/1956 | Koski et al. | |
| 2,984,321 A | 5/1961 | Schultze | |
| 3,447,644 A | 6/1969 | Duckett | |
| 4,166,612 A * | 9/1979 | Freitag | F16F 9/49 188/284 |
| 4,852,703 A | 8/1989 | Nishimoto | |
| 5,150,775 A | 9/1992 | Charles et al. | |
| 5,157,806 A | 10/1992 | Wartian | |
| 5,249,652 A | 10/1993 | Leitzman et al. | |

(Continued)

FOREIGN PATENT DOCUMENTS

| | | |
|---|---|---|
| CN | 108006145 A | 5/2018 |
| DE | 29910104 U1 | 7/2000 |

(Continued)

OTHER PUBLICATIONS

International Search Report and Written Opinion regarding International Application No. PCT/US2020/051721, dated Dec. 8, 2020.

*Primary Examiner* — Pamela Rodriguez
(74) *Attorney, Agent, or Firm* — Harness, Dickey & Pierce, P.L.C.

(57) ABSTRACT

A damper having a pressure tube, a piston, a hydraulic compression stop assembly, and a base valve assembly is provided. The piston is arranged in sliding engagement inside the pressure tube and divides the pressure tube into first and second working chambers. The hydraulic compression stop assembly is positioned in the second working chamber and includes a sleeve and a plunger. The sleeve extends from the base valve assembly to define a sleeve cavity. The plunger extends from the piston and/or piston rod and is designed to slide into the sleeve cavity when the piston approaches a fully compressed position of the damper. The base valve assembly includes intake passageways and an intake valve. The intake valve is constructed as a one-way valve that permits fluid to flow in one direction into the sleeve cavity through the intake passageways.

8 Claims, 9 Drawing Sheets

(56) References Cited

U.S. PATENT DOCUMENTS

| | | |
|---|---|---|
| 6,814,193 B2 | 11/2004 | Grundei |
| 9,091,320 B1 | 7/2015 | Smith et al. |
| 9,593,697 B2 | 3/2017 | Baalmann et al. |
| 9,605,726 B2 | 3/2017 | Baldoni et al. |
| 9,695,899 B2 | 7/2017 | Smith et al. |
| 9,776,468 B2 | 10/2017 | Teraoka et al. |
| 9,909,638 B2 | 3/2018 | Chyla et al. |
| 9,982,738 B2 | 5/2018 | Lizarraga Senar |
| 10,208,830 B2 | 2/2019 | Bruno et al. |
| 10,876,591 B2 * | 12/2020 | Mallin .............. F16F 9/49 |
| 2008/0053765 A1 | 3/2008 | Tomonaga et al. |
| 2010/0059321 A1 | 3/2010 | Boivin |
| 2012/0061194 A1 | 3/2012 | Yu |
| 2014/0299426 A1 | 10/2014 | Grzesik et al. |
| 2015/0090548 A1 | 4/2015 | Yamanaka |
| 2015/0247549 A1 | 9/2015 | Takeno et al. |
| 2016/0223045 A1 | 8/2016 | Baldoni et al. |
| 2016/0230835 A1* | 8/2016 | Groves .............. F16F 9/48 |
| 2017/0009840 A1 | 1/2017 | Hertz |
| 2018/0058533 A1 | 3/2018 | Bruno et al. |
| 2018/0119770 A1 | 5/2018 | Bruno et al. |
| 2018/0223942 A1 | 8/2018 | Kus et al. |

FOREIGN PATENT DOCUMENTS

| | | |
|---|---|---|
| DE | 102004008956 A1 | 9/2005 |
| DE | 102014223480 A1 | 5/2016 |
| DE | 102015121140 A1 | 6/2017 |
| EP | 2302252 B1 | 11/2012 |
| JP | 2016065626 A | 4/2016 |
| KR | 10-2004-0024705 A | 3/2004 |
| WO | 2014137661 A1 | 9/2014 |
| WO | WO-2017001675 A1 | 1/2017 |
| WO | 2018155339 A1 | 8/2018 |

* cited by examiner

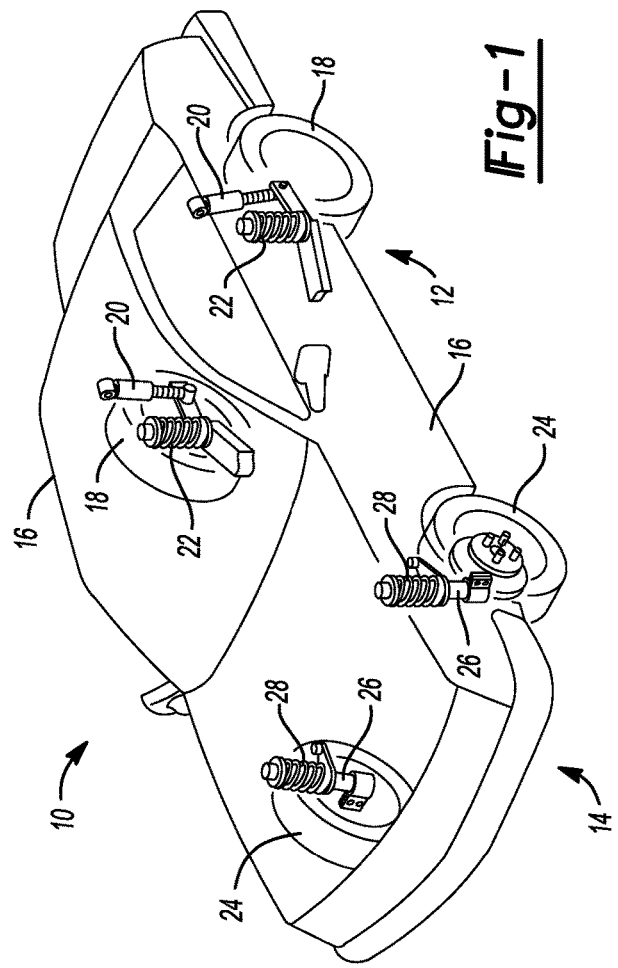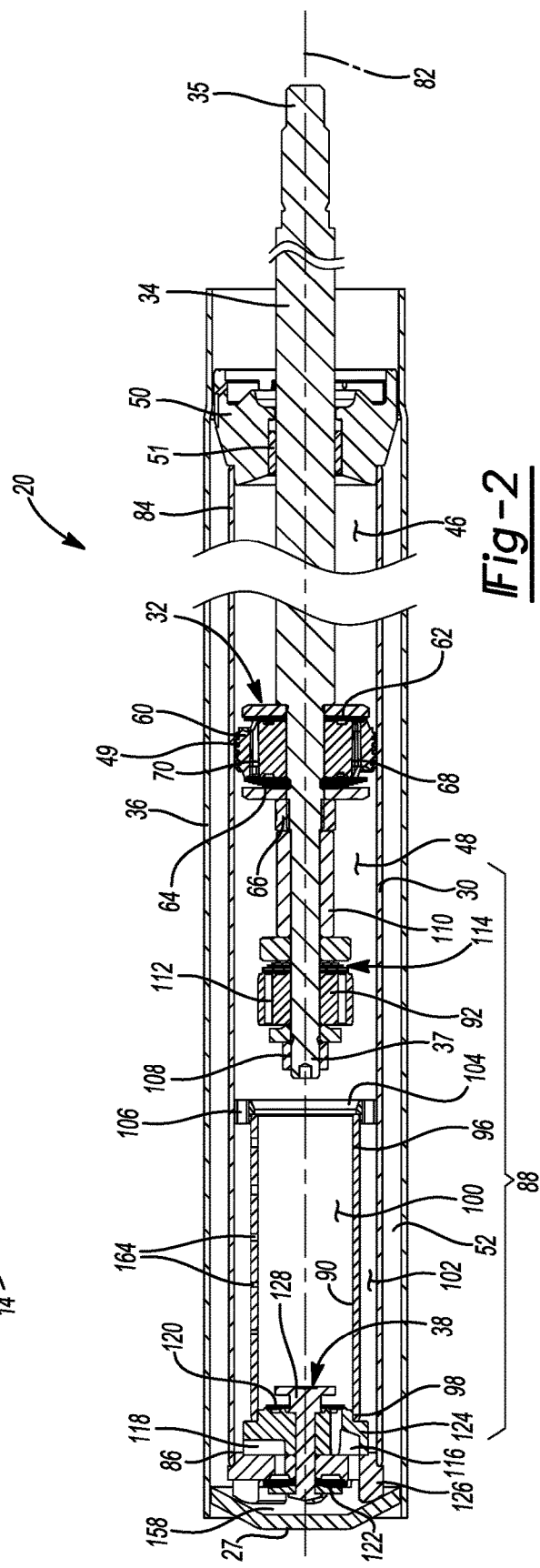

SHOCK ABSORBER BASE VALVE ASSEMBLY

FIELD

The present disclosure relates generally to dampers for vehicle suspension systems and more particularly to dampers with hydraulic compression stops.

BACKGROUND

The statements in this section merely provide background information related to the present disclosure and may not constitute prior art.

In general, dampers are used to absorb and dissipate the impact and rebound movement of a vehicle's suspension system and keep the vehicle's tires in contact with the ground. Dampers are typically installed alongside a spring (as a stand-alone shock absorber) or inside a spring (as part of a coil-over shock and strut assembly) and placed in front and rear suspension systems. The damper is attached to a frame member or other sprung component of the vehicle by an upper mount and is attached to a suspension member or other unsprung component of the suspension by a lower mount.

Conventional hydraulic dampers include a pressure tube, which acts as a hydraulic cylinder. A piston is slidably disposed within the pressure tube with the piston separating the interior of the pressure tube into two fluid chambers. A piston rod is connected to the piston and extends out of one end of the pressure tube where it is adapted for attachment to a sprung or unsprung component of the vehicle. The opposite end of the pressure tube is adapted for attachment to the other sprung or unsprung component of the vehicle. A first valving system, typically incorporated within the piston, functions to create a damping load during the damper's extension (i.e., rebound stroke). A second valving system, typically incorporated within the piston in a mono-tube damper and in a base valve assembly in a dual-tube damper, functions to create a damping force during the damper's compression stroke.

Many hydraulic dampers include features designed to prevent the piston and piston rod from coming to an abrupt stop at the end of a compression stroke. In some instances, a simple bumper is used to cushion the piston and the piston rod when they reach the end of a compression stroke. More sophisticated compression stops have been developed that utilize a hydraulic plunger to slow the movement of the piston and the piston rod at the end of a compression stroke by increasing (i.e., ramping up) the damping force acting on the piston. Adding a hydraulic compression stop to a passive damper typically requires significant changes or modifications to the structure of the damper and to manufacturing and assembly processes. Accordingly, there remains a need for improved hydraulic compression stops that can be more easily incorporated into existing passive damper designs without requiring significant changes or modifications to the damper.

SUMMARY

This section provides a general summary of the disclosure, and is not a comprehensive disclosure of its full scope or all of its features.

In accordance with one aspect of the present disclosure, a damper having a pressure tube, a piston, a hydraulic compression stop assembly, and a base valve assembly is provided. The pressure tube extends longitudinally between a first pressure tube end and a second pressure tube end. The piston is arranged in sliding engagement inside the pressure tube for movement between a fully extended position and a fully compressed position. The piston divides the pressure tube into first and second working chambers and is coupled to a piston rod. The hydraulic compression stop assembly is positioned in the second working chamber. The hydraulic compression stop assembly includes a sleeve that extends from the base valve assembly to define a sleeve cavity and a plunger that extends from the piston and/or piston rod.

The sleeve of the hydraulic compression stop assembly is designed to receive the plunger, where the plunger is received in sliding engagement with the sleeve cavity when the piston approaches the fully compressed position. The base valve assembly is positioned at the second pressure tube end and includes one or more intake passageways and an intake valve. The intake valve is constructed as a one-way valve that permits fluid to flow in one direction into the sleeve cavity through the one or more intake passageways.

In accordance with another aspect of the present disclosure, the base valve assembly includes a first base valve portion and a second base valve portion. The first base valve portion is partially received in the sleeve cavity and the second base valve portion that is partially received in the second pressure tube end. In accordance with yet another aspect of the present disclosure, the damper includes a reserve tube that extends annularly about the pressure tube. This arrangement creates a reservoir chamber that is positioned radially between the reserve tube and the pressure tube. In accordance with this aspect of the present disclosure, the base valve assembly includes one or more compression passageways and one or more intake passageways. The base valve assembly further comprises a compression valve that is constructed as a one-way valve and permits fluid to flow in only one direction from the second working chamber to the reservoir chamber through the compression passageway(s). The base valve assembly also includes an intake valve that is constructed as a one-way valve and permits fluid to flow in only one direction from the reservoir chamber to the sleeve cavity through the intake passageway(s).

In traditional hydraulic compression stop designs, passages and/or valving was required in the plunger to prevent hydraulic lock of the plunger in the sleeve cavity during rebound strokes. Advantageously, the damper designs described herein eliminate the need for such passages and/or valving in the plunger because the base valve assembly includes an integrated intake valve to supplies fluid to the sleeve cavity during rebound strokes.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a side perspective view of an exemplary vehicle including hydraulic dampers or shock absorbers according to the principles of the present disclosure;

FIG. 2 is a side cross-sectional view of an exemplary damper with a hydraulic compression stop assembly and base valve assembly that have been constructed in accordance with the teachings of the present disclosure;

DETAILED DESCRIPTION

Figure 3:
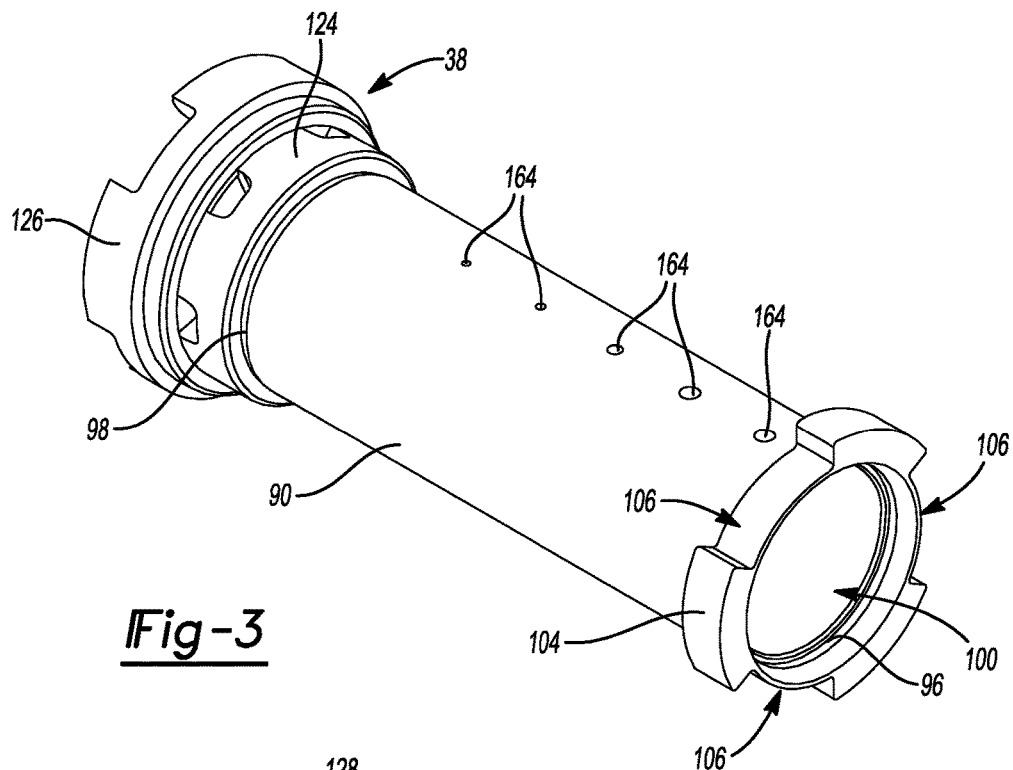
FIG. 3 is a side perspective view of the hydraulic compression stop assembly and base valve assembly of the exemplary damper illustrated in FIG. 1.

Referring to the Figures, wherein like numerals indicate corresponding parts throughout the several views, a damper 20 is illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring now to FIG. 1, a vehicle 10 includes a rear suspension 12, a front suspension 14, and a body 16. The rear suspension 12 has a transversely extending rear axle assembly (not shown) to which rear wheels 18 of the vehicle 10 are mounted. The rear axle assembly is operatively connected to the body 16 by a pair of dampers 20 and a pair of helical coil springs 22. Similarly, the front suspension 14 includes a transversely extending front axle assembly (not shown) to which front wheels 24 of the vehicle 10 are mounted. The front axle assembly is operatively connected to the body 16 by a second pair of dampers 26 and a pair of helical coil springs 28. The dampers 20, 26 dampen the relative motion of the unsprung portion (e.g., the front and rear axle assemblies) and the sprung portion (e.g., the body 16) of the vehicle 10. While the vehicle 10 has been depicted as a passenger car having front and rear axle assemblies, the dampers 20, 26 may be used with other types of vehicles or machinery, or in other types of applications such as vehicles incorporating independent front and/or independent rear suspension systems. Further, the term "damper" as used herein is meant to refer to shock absorbers and shock absorber systems in general and thus will include MacPherson struts. It should also be appreciated that the scope of the subject disclosure is intended to include the stand-alone dampers 20 and the coil-over dampers 26.

With reference to FIG. 2, the damper 20 includes a pressure tube 30, a piston 32, a piston rod 34, a reserve tube 36, and a base valve assembly 38. The piston assembly 32 is slidably disposed within the pressure tube 30 and divides the pressure tube 30 into a first working chamber 46 and a second working chamber 48. A seal 49 is disposed between the piston 32 and the pressure tube 30 to permit sliding movement of the piston 32 with respect to the pressure tube 30 without generating undue frictional forces as well as sealing the first working chamber 46 from the second working chamber 48. The piston rod 34 extends between a first piston rod end 35 and a second piston rod end 37. The piston rod 34 is attached (i.e., coupled) to the piston 32. The piston rod 34 extends through the first working chamber 46 and through a rod guide assembly 50. Accordingly, the first piston rod end 35 is always positioned outside the pressure tube 30. A piston rod seal 51 seals the interface between the rod guide assembly 50 and the piston rod 34.

The first piston rod end 35 is adapted to be secured to either a sprung or unsprung component of a vehicle (not shown). Because the piston rod 34 extends only through the first working chamber 46 and not the second working chamber 48, extension and compression movements of the piston 32 (illustrated in FIGS. 11 and 12) with respect to the pressure tube 30 causes a difference in the amount of fluid displaced in the first working chamber 46 compared to the amount of fluid displaced in the second working chamber 48. The difference in the amount of fluid displaced is known as the "rod volume" and during extension movements it flows through the base valve assembly 38. During a compression movement of the piston 32 with respect to the pressure tube 30, valving 62 within the piston 32 allows fluid to flow from the second working chamber 48 to the first working chamber 46 while the "rod volume" of fluid flow flows through the base valve assembly 38.

The base valve assembly 38 is positioned at a base end 27 of the damper 20 which is adapted to be secured to either a sprung or unsprung component of the vehicle (not shown) and controls the flow of fluid between the second working chamber 48 and a reservoir chamber 52 positioned radially between the pressure tube 30 and the reserve tube 36. When the damper 20 extends in length, an additional volume of fluid is needed in the second working chamber 48 due to the rod volume and fluid will flow from the reservoir chamber 52 to the second working chamber 48 through the base valve assembly 38. When the damper 20 compresses in length, an excess of fluid must be removed from the second working chamber 48 due to the rod volume. Thus, fluid will flow from the second working chamber 48 to the reservoir chamber 52 through the base valve assembly 38.

The piston 32 comprises a piston body 60, a first compression valve assembly 62, a first extension valve assembly 64, and a nut 66. The nut 66 is threaded onto the piston rod 34 to secure the first compression valve assembly 62, the piston body 60, and the first extension valve assembly 64 to the piston rod 34. The piston body 60 defines a first plurality of compression passages 68 and a first plurality of extension passages 70.

The pressure tube 30 has a cylindrical shape, which extends annularly about a damper axis 82 and longitudinally between a first pressure tube end 84 and a second pressure tube end 86. The first pressure tube end 84 mates with the rod guide assembly 50 and the base valve assembly 38 mates with the second pressure tube end 86. It should be appreciated that when the terms "longitudinal" and "longitudinally" are used herein, they are meant to describe structures, dimensions, directions, or movements that are substantially parallel to the damper axis 82.

Although a dual-tube damper 20 is illustrated in FIG. 2, it should be appreciated that the subject disclosure is equally applicable to mono-tube dampers. Such mono-tube dampers lack reserve tube 36 shown in FIG. 2. As a non-limiting example, the hydraulic compression stop assembly 88 discussed herein could be adapted for and installed in the mono-tube damper described in U.S. Pat. No. 9,533,538, which is also assigned to Tenneco Operating Automotive Co., Inc.

Figure 4:
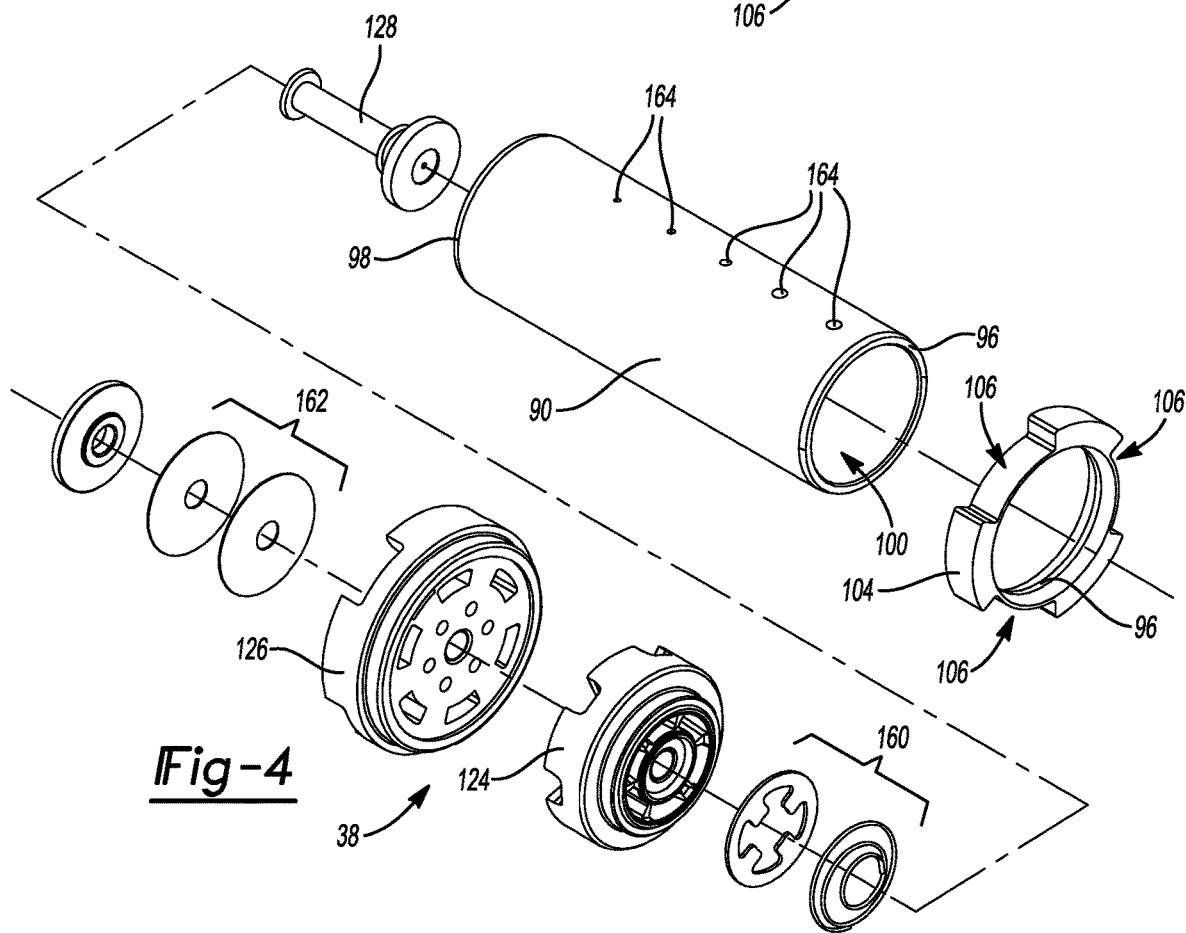
FIG. 4 is a perspective exploded view of the hydraulic compression stop assembly and base valve assembly of the exemplary damper illustrated in FIG. 1.
Figure 5:
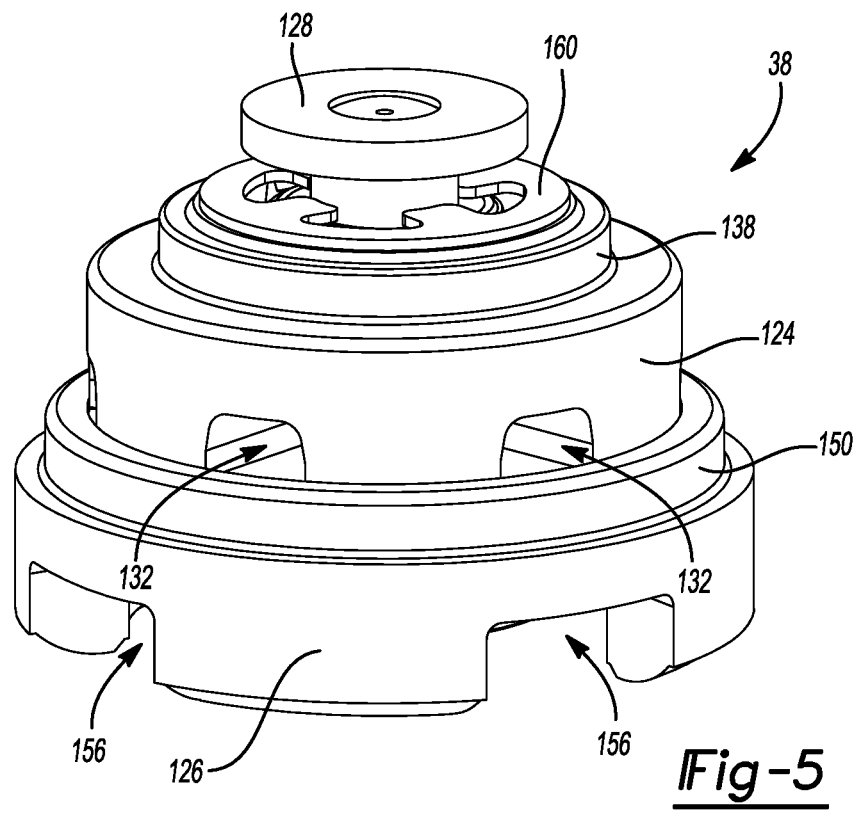
FIG. 5 is a top perspective view of the base valve assembly of the exemplary damper illustrated in FIG. 1.
Figure 6:
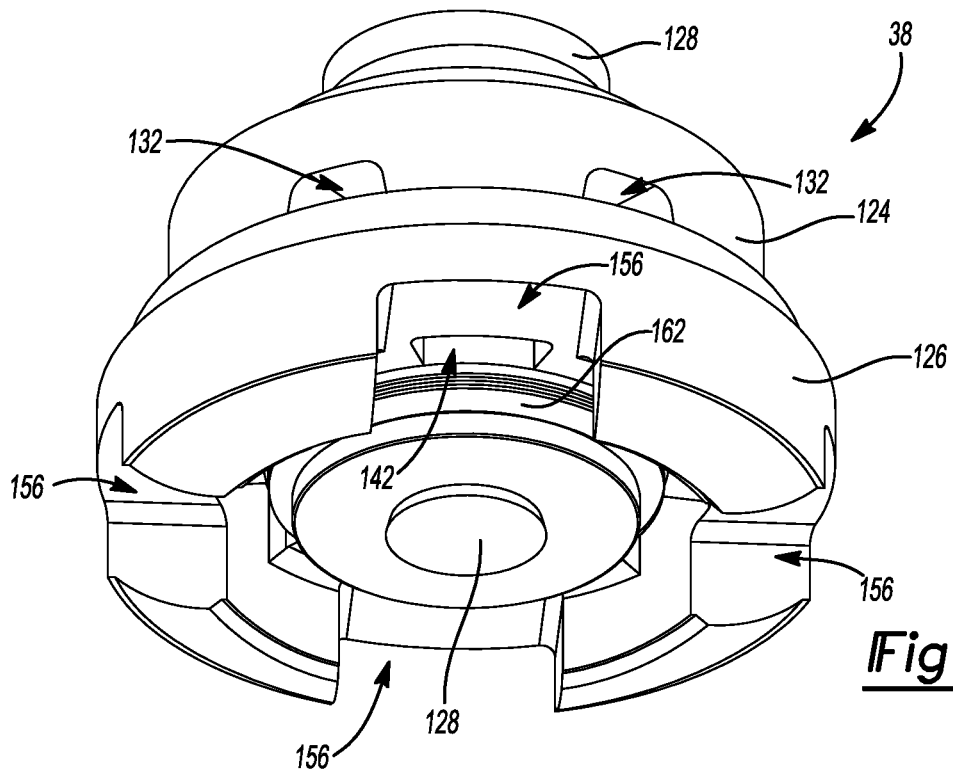
FIG. 6 is a bottom perspective view of the base valve assembly of the exemplary damper illustrated in FIG. 1.
Figure 11:
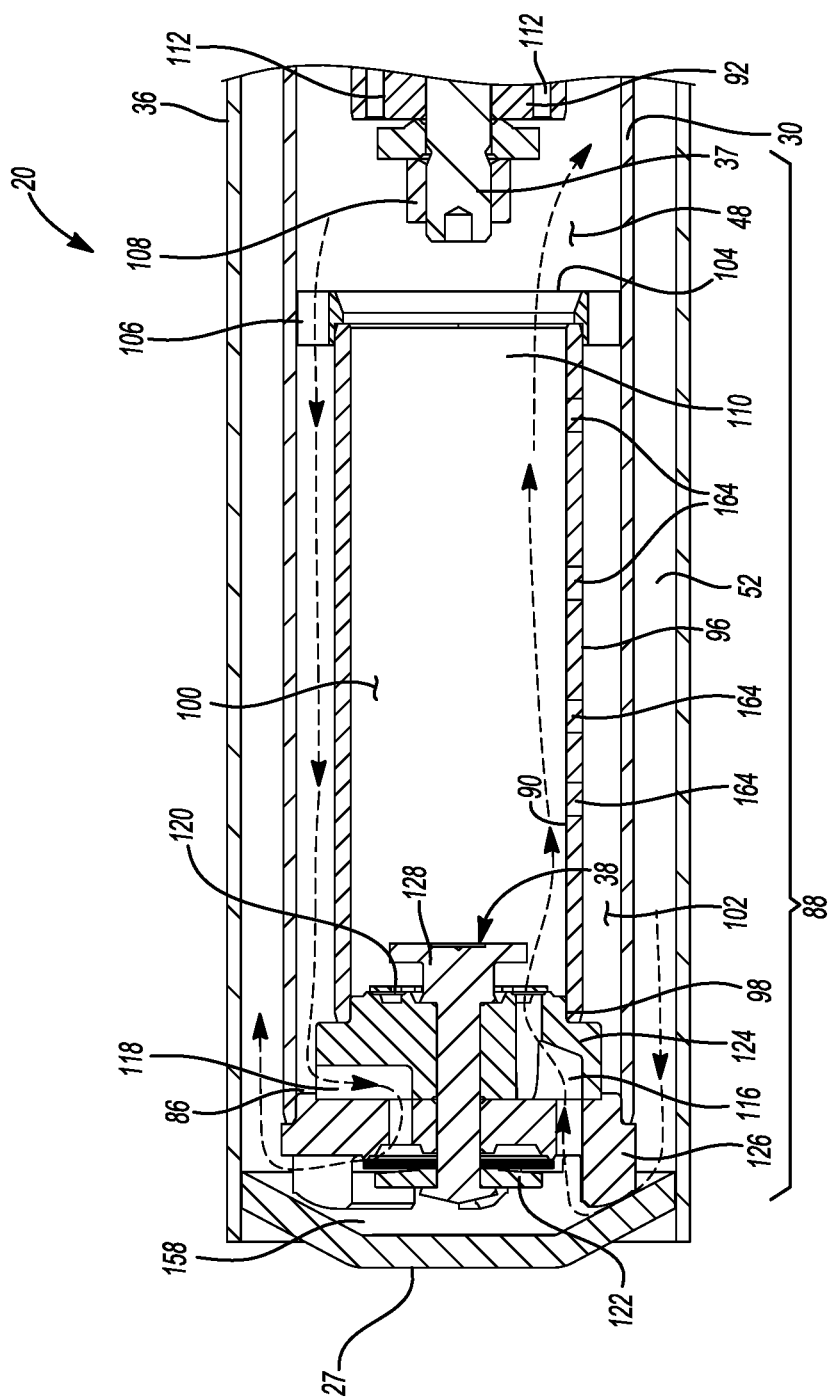
FIG. 11 is an enlarged side perspective view of the exemplary damper illustrated in FIG. 1 where the plunger and sleeve of the hydraulic compression stop assembly are not engaged.
Figure 12:
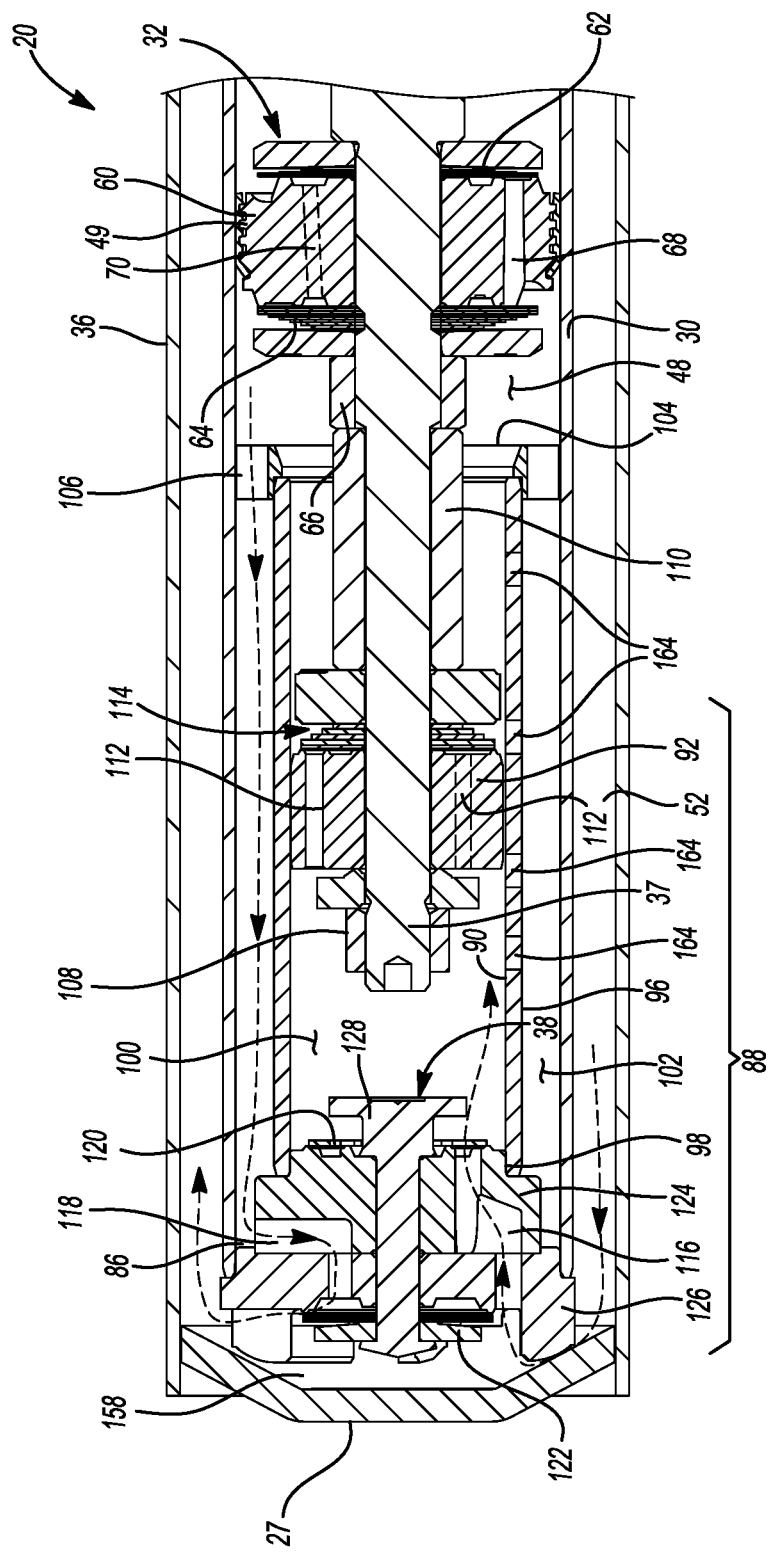
FIG. 12 is an enlarged side perspective view of the exemplary damper illustrated in FIG. 1 where the plunger and sleeve of the hydraulic compression stop assembly are shown in sliding engagement.

With additional reference to FIGS. 3 and 4, the damper 20 includes a hydraulic compression stop assembly 88 positioned inside the second working chamber 48. The hydraulic compression stop assembly 88 includes a sleeve 90 and a plunger 92. The plunger 92 is arranged in sliding engagement with the sleeve 90 and can therefore move (i.e., slide) between a fully extended position (where the plunger 92 is outside of the sleeve 90, as shown in FIG. 11) and a fully compressed position (where the plunger 92 is inside of the sleeve 90, as shown in FIG. 12).

The sleeve 90 of the hydraulic compression stop assembly 88 is positioned inside the second pressure tube end 86. The sleeve 90 extends longitudinally between a first sleeve end 96 and a second sleeve end 98. The second sleeve end 98 is positioned adjacent to the second pressure tube end 86, while the first sleeve end 96 is positioned closer to the piston 32. As will be explained in greater detail below, the sleeve 90 is mounted on the base valve assembly 38 at the second sleeve end 98. This eliminates the need to support the sleeve 90 by welding and/or a secondary part. The sleeve 90 defines a sleeve cavity 100 that is open at the first sleeve end 96 and closed at the second sleeve end 98 by the base valve assembly 38. The sleeve 90 of the hydraulic compression stop assembly 88 is positioned concentrically within the pressure tube 30 such that an annular channel 102 is defined radially between the sleeve 90 and the pressure tube 30. Optionally, the hydraulic compression stop assembly 88 may include a centering ring 104 that is mounted to and that extends radially outwardly from the first sleeve end 96. The centering ring 104 is arranged in contact with the pressure tube 30 and includes one or more ring orifices 106 that permit fluid flow into and out of the annular channel 102 between the sleeve 90 and the pressure tube 30.

The plunger 92 of the hydraulic compression stop assembly 88 is mounted to the second piston rod end 37 by nut 108. A spacer 110, positioned over the piston rod 34, holds the plunger 92 a pre-defined longitudinal distance away from the piston 32. The sleeve cavity 100 is configured to receive the plunger 92 in sliding engagement with the sleeve 90 when the plunger 92 approaches the fully compressed position. Optionally, the plunger 92 may include one or more plunger passageways 112 and a plunger valve 114. The plunger valve 114 is constructed as a one-way valve that permits fluid to flow in one direction from the sleeve cavity 100 to the second working chamber 48 through the plunger passageways 112 when the plunger 92 is received in the sleeve cavity 100 during a compression stroke. The plunger valve 114, which may be provided in the form of a spring-disc stack or disc stack, can therefore be used to provide an optional blow-off function where the plunger valve 114 will open when the pressure in the sleeve cavity 100 exceeds the break-pressure of the plunger valve 114.

The base valve assembly 38 includes one or more intake passageways 116 and one or more compression passageways 118. The base valve assembly 38 also includes an intake valve 120 and a compression valve 122. The intake valve 120 is constructed as a one-way valve that permits fluid to flow in only one direction from the reservoir chamber 52 to the sleeve cavity 100 through the intake passageway(s) 116 in the base valve assembly 38. The compression valve 122 is constructed as a one-way valve that permits fluid to flow in only one direction from the annular channel 102 to the reservoir chamber 52 through the compression passageway(s) 118 in the base valve assembly 38.

With additional reference to FIG. 5-10, in the illustrated embodiment, the base valve assembly 38 includes a first base valve portion 124 that is partially received in the sleeve cavity 100 and a second base valve portion 126 that is partially received in the second pressure tube end 86. The first and second base valve portions 124, 126 are separate parts that are held together by a pin 128.

Figure 7:
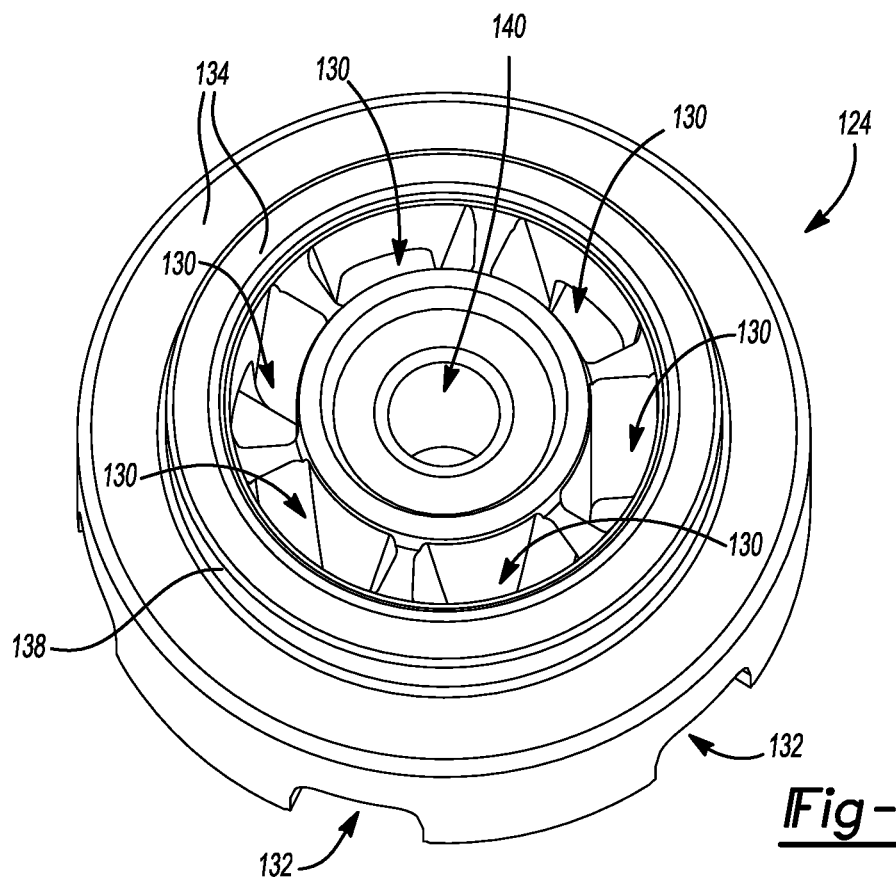
FIG. 7 is a top perspective view of an exemplary first base valve portion of the base valve assembly illustrated in FIG. 5.
Figure 8:
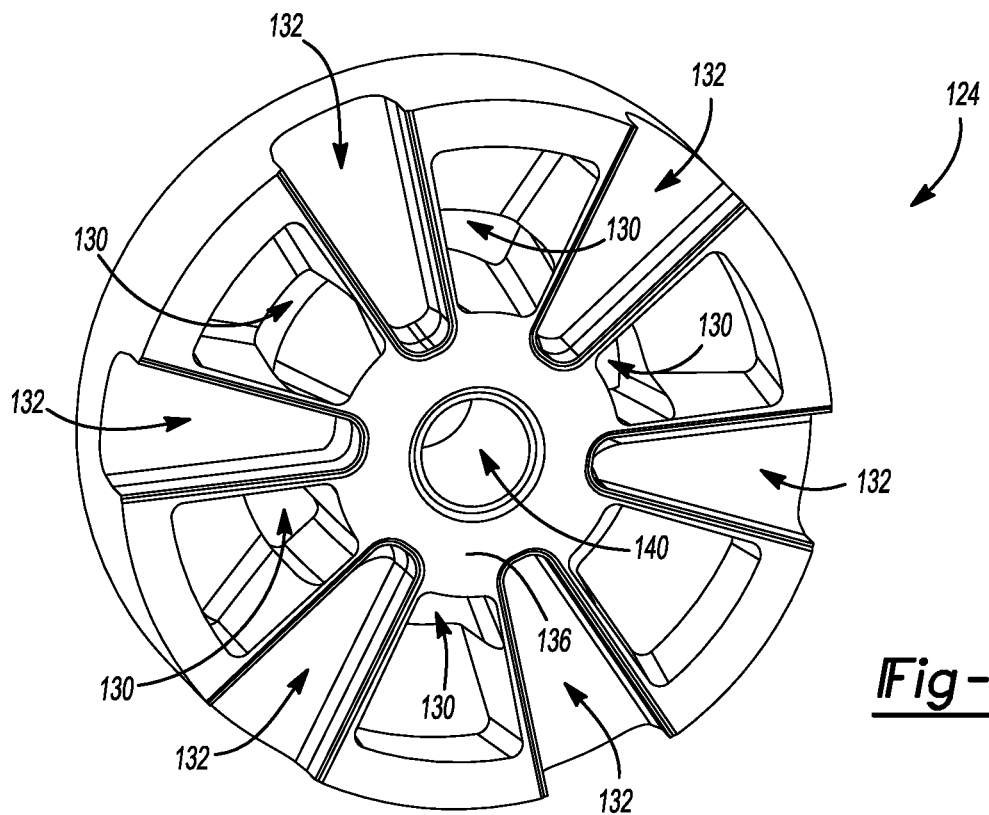
FIG. 8 is a bottom perspective view of the exemplary first base valve portion of the base valve assembly illustrated in FIG. 5.

As best seen in FIGS. 7 and 8, the first base valve portion 124 includes one or more intake passages 130 and one or more channels 132 that are not arranged in fluid communication with the intake passages 130. The first base valve portion 124 has a sleeve facing surface 134 and a first mating surface 136. The sleeve facing surface 134 of the first base valve portion 124 includes a first shoulder 138 that is configured to be press-fit into the second sleeve end 98. The intake passages 130 extend through the first base valve portion 124 from the sleeve facing surface 134 to the first mating surface 136 and are arranged at circumferentially spaced locations about a first pin bore 140. The channels 132 in the first base valve portion 124 are arranged along and are open to the first mating surface 136. The channels 132 in the first base valve portion 124 do not open to the sleeve facing surface 134. The channels 132 in the first base valve portion are circumferentially spaced between the intake passages 130 and are positioned radially outward of the first pin bore 140.

Figure 9:
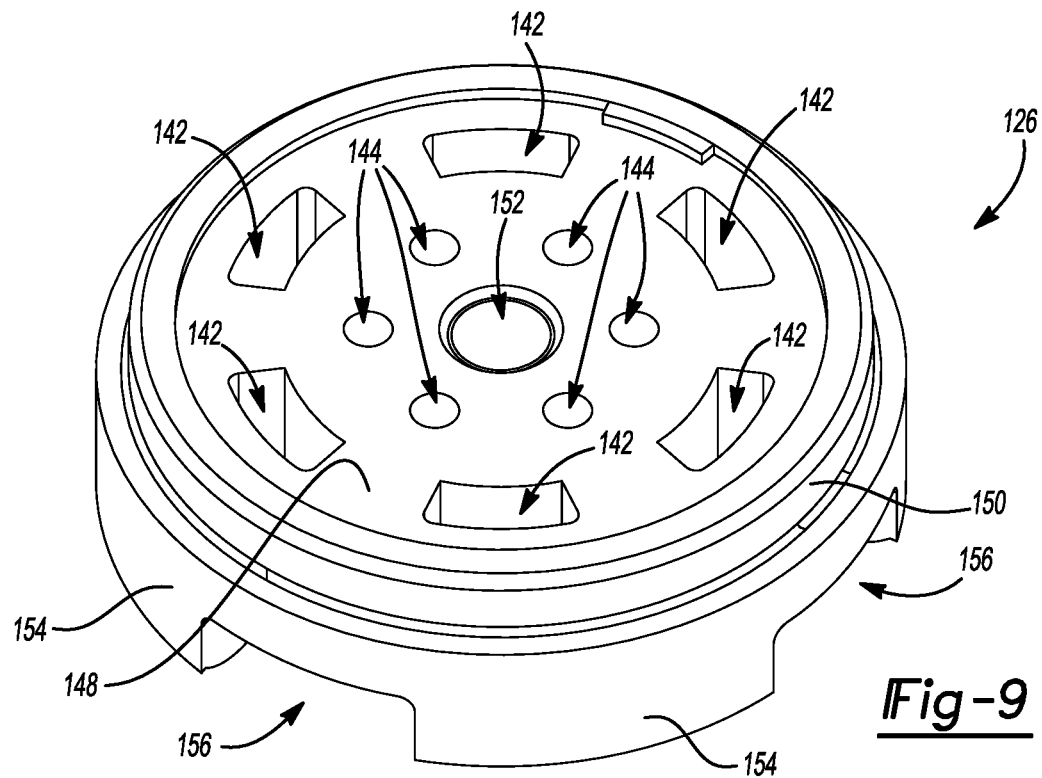
FIG. 9 is a top perspective view of an exemplary second base valve portion of the base valve assembly illustrated in FIG. 5.
Figure 10:
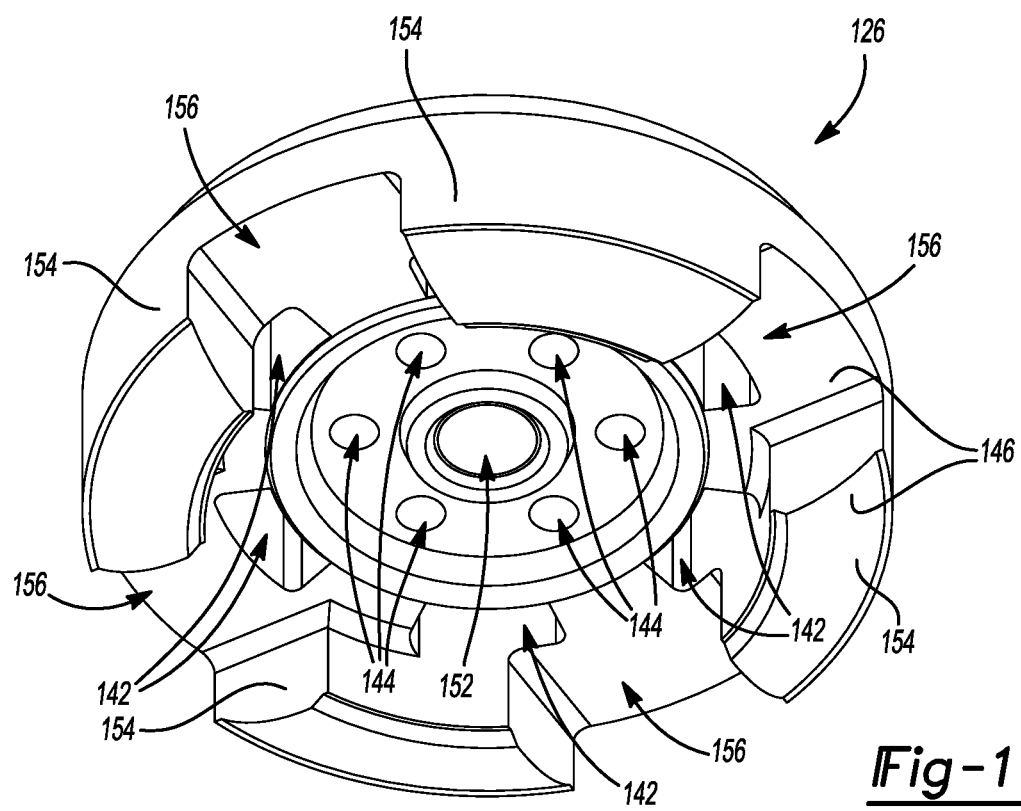
FIG. 10 is a bottom perspective view of the exemplary second base valve portion of the base valve assembly illustrated in FIG. 5.

As best seen in FIGS. 9 and 10, the second base valve portion 126 includes one or more intake orifices 142 and one or more compression orifices 144 that are not arranged in fluid communication with the intake orifices 142. The second base valve portion 126 has a base end facing surface 146 and a second mating surface 148. The base end facing surface 146 of the second base valve portion 126 faces the base end 27 of the damper 20. The second mating surface 148 of the second base valve portion 126 includes a second shoulder 150 that is configured to be press-fit into the second pressure tube end 86. The intake and compression orifices 142, 144 extend through the second base valve portion 126 from the base end facing surface 146 to the second mating surface 148 and are arranged at circumferentially spaced locations about a second pin bore 152. The compression orifices 144 in the second base valve portion 126 are also positioned radially inward of the intake orifices 142. The second base valve portion further includes a plurality of legs 154 that are arranged along the base end facing surface 146 at circumferentially spaced locations such that one or more notches 156 are defined along the base end facing surface 146. When the base valve assembly 38 is installed in the damper 20, the legs 154 of the second base valve portion 126 contact the base end 27 and define an end cavity 158 therebetween (see FIG. 2). The notches 156 in the second base valve portion 126 are therefore arranged along and are open to the base end facing surface 146 and are arranged in fluid communication with the intake and compression orifices 142, 144.

When the base valve assembly 38 is assembled (FIGS. 5 and 6), the pin 128 is received in the first pin bore 140 and the second pin bore 152 and therefore holds the first and second base valve portions 124, 126 together with the first and second mating surfaces 136, 148 arranged in an abutting relationship. The intake passages 130 in the first base valve portion 124 are arranged in fluid communication with the intake orifices 142 in the second base valve portion 126 to define the intake passageway(s) 116 through the base valve assembly 38. The channels 132 in the first base valve portion 124 are arranged in fluid communication with the compression orifices 144 in the second base valve portion 126 to define the compression passageway(s) 118 through the base valve assembly 38. The intake valve 120 of the base valve assembly 38 includes a spring-disc stack 160 that opens and closes the intake passages 130 in the first base valve portion 124. The compression valve 122 of the base valve assembly 38 includes a disc stack 162 that opens and closed the compression orifices 144 in the second base valve portion 126.

The sleeve 90 of the hydraulic compression stop assembly 88 may optionally include a plurality of orifices 164 that are spaced longitudinally apart from one another such that the number of the orifices 164 that communicate fluid between the sleeve cavity 100 and the annular channel 102 between the sleeve 90 and the pressure tube 30 decreases when the plunger 92 moves from the fully extended position to the fully compressed position. This occurs as the plunger 92 slides past the orifices 164 leaving fewer and fewer orifices 164 in fluid communication with the sleeve cavity 100 as the plunger 92 approaches the fully compressed position. The decrease in the number of orifices 164 available to communicate fluid from the hydraulic chamber 110 to the second working chamber 48, increases the flow restriction, and creates a progressive increase in damping force as the plunger 92 approaches the fully compressed position.

The hydraulic compression stop assembly 88 described herein reduces the end stop loads transferred to the vehicle body for improved ride comfort by hydraulically generating an additional damping force at the end of compression strokes of the damper 20. Advantageously, the particular configuration of the hydraulic compression stop assembly 88 described herein can be constructed at a low cost and can be installed in conventional, passive dampers without requiring significant changes or modifications to the structure of the damper or to manufacturing and assembly processes. The pre-assembled sleeve 90 and base valve assembly 38 can be press-fit into the second pressure tube end 86 during assembly of the damper 20 on an assembly line.

FIG. 11 illustrates the operation of the damper 20 when the plunger 92 and sleeve 90 of the hydraulic compression stop assembly 88 are not engaged, while FIG. 12 illustrates the operation of the damper 20 when the plunger 92 has been received in the sleeve 90 of the hydraulic compression stop assembly 88. In FIGS. 11 and 12, the fluid flow during compression and rebound/extension strokes is illustrated in dashed lines. During rebound strokes, fluid flows from the reservoir chamber 52 to the sleeve cavity 100 via the intake passageway(s) 116 in the base valve assembly 38 as permitted by the intake valve 120 of the base valve assembly 38. During compression strokes, fluid flows from the second working chamber 48 into the annular channel 102 between the sleeve 90 and the pressure tube 30 and then onto the reservoir chamber 52 via the compression passageway(s)

118 in the base valve assembly 38, as permitted by the compression valve 122 on the base valve assembly 38.

Figure 13:
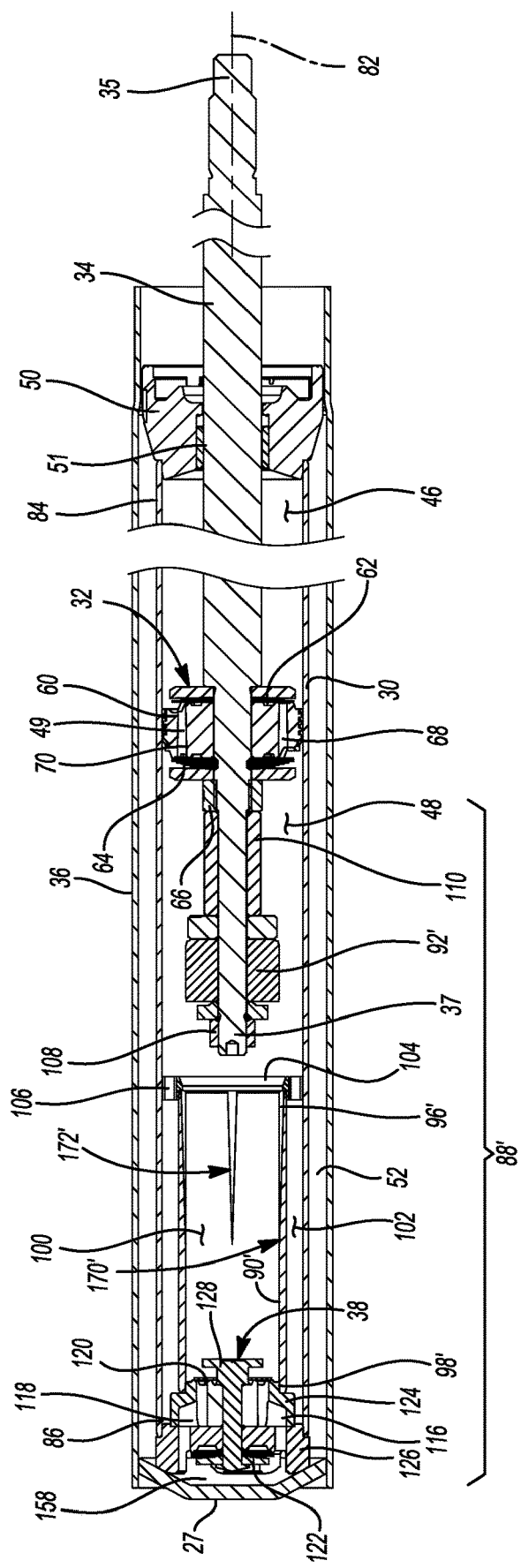
FIG. 13 is a side cross-sectional view of another exemplary damper with a hydraulic compression stop assembly and base valve assembly that have been constructed in accordance with the teachings of the present disclosure.
Figure 14:
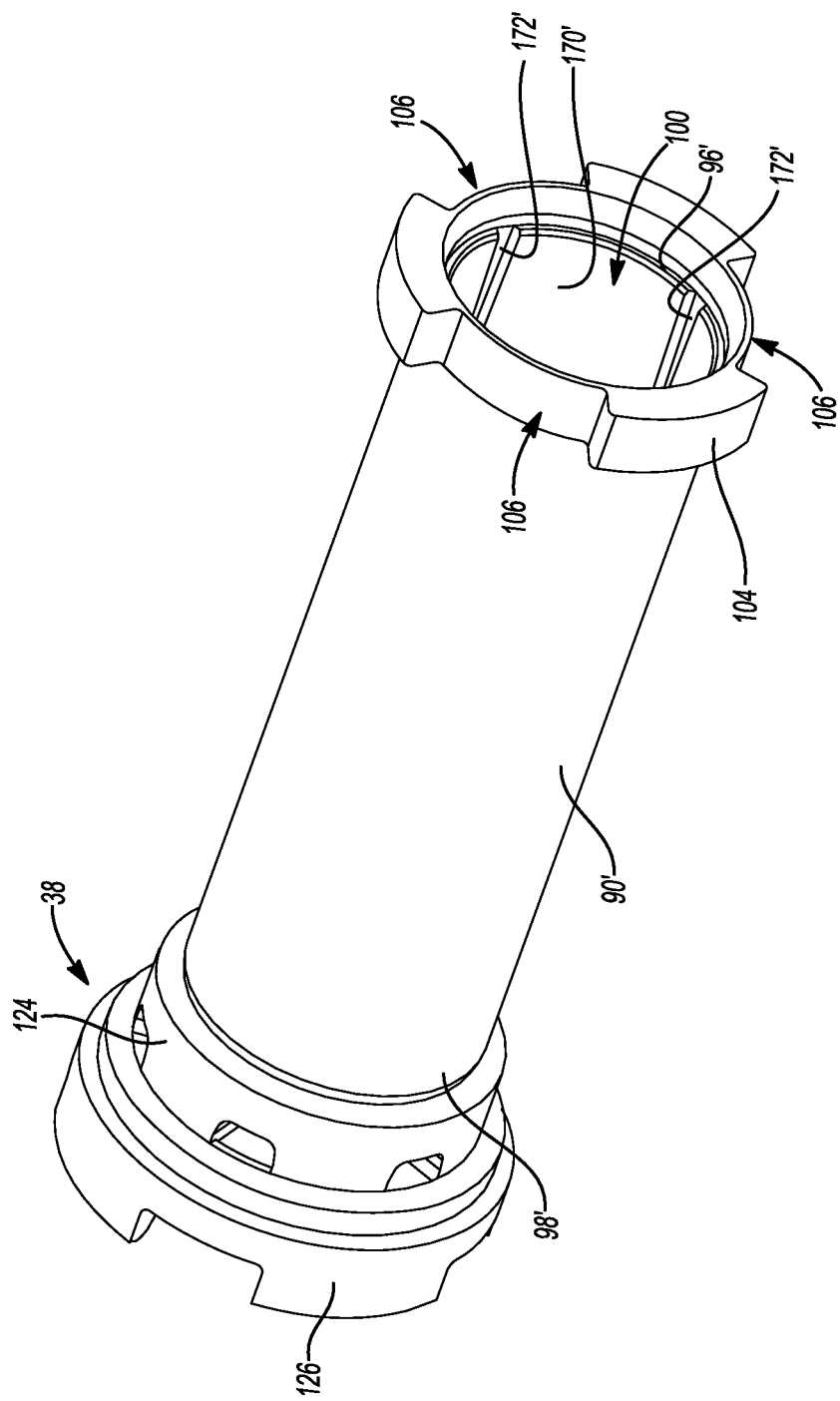
FIG. 14 is a side perspective view of the hydraulic compression stop assembly and base valve assembly of the exemplary damper illustrated in FIG. 13.

With reference to FIGS. 13 and 14, illustrate another exemplary damper 20', with a hydraulic compression stop assembly 88' of an alternative configuration. Many of the elements of the damper 20' shown in FIGS. 13 and 14 are the same as the elements of the damper 20 shown in FIGS. 2-12 and therefore share the same reference numbers. The elements in FIGS. 13 and 14 that are new, different, or have been modified are labeled with reference numbers where a prime (') annotation has been appended after the reference numeral.

As shown in FIG. 13, damper 20' includes a solid plunger 92' that is free of orifices, passages, or channels. In traditional hydraulic compression stop designs, passages and/or valving was required in the plunger to prevent hydraulic lock of the plunger in the sleeve cavity during rebound strokes. The solid plunger 92' is less complicated to manufacture and assembled and therefore reduces cost and can also reduce noise because fewer intakes can translate into less noise generation. The hydraulic compression stop assembly 88' illustrated in FIGS. 13 and 14 also includes a sleeve 90' with an inside surface 170' that has one or more longitudinal grooves 172' that permit fluid flow into and out of the sleeve cavity 100 when the plunger 92' is received inside the sleeve 90'. In other words, the longitudinal grooves 172' permit limited fluid flow around the outside of the plunger 92' when the plunger 92' is received inside the sleeve 90'. As shown in FIGS. 13 and 14, the longitudinal grooves 172' may optionally decrease in cross-section (i.e., decrease in depth and/or width) moving from the first sleeve end 96' to the second sleeve end 98' to restrict flow and increase the dampening force produced by the hydraulic compression stop assembly 88' as the plunger 92' approaches the base valve assembly 38 (in the fully compression position). It should be appreciated that the damper 20' described herein can do without orifices, passages, or channels in the plunger 92' because the base valve assembly 38 includes an integrated intake passageway 116 and intake valve 120 that supplies fluid to the sleeve cavity 100 during rebound strokes and because fluid can flow through the longitudinal grooves 172' and thus around the plunger 92' during compression strokes.

Many other modifications and variations of the present disclosure are possible in light of the above teachings and may be practiced otherwise than as specifically described while within the scope of the appended claims.

What is claimed is:

1. A damper comprising:
a pressure tube extending longitudinally between a first pressure tube end and a second pressure tube end;
a piston arranged in sliding engagement inside the pressure tube for movement between an extended position and a compressed position;
said piston dividing the pressure tube into a first working chamber and a second working chamber;
a piston rod coupled to the piston;
a base valve assembly positioned at the second pressure tube end; and
a hydraulic compression stop assembly positioned in the second working chamber, the hydraulic compression stop assembly including a sleeve extending from the base valve assembly to define a sleeve cavity and a plunger extending from at least one of the piston and the piston rod, the sleeve being configured to receive the plunger in sliding engagement with the sleeve cavity when the piston approaches the compressed position,
wherein the base valve assembly is constructed to permit fluid to flow in one direction into the sleeve cavity and includes a first base valve portion that is at least partially received in the sleeve cavity and a second base valve portion that is at least partially received in the second pressure tube end, wherein the first base valve portion includes one or more intake passages and one or more channels that are not arranged in fluid communication with the intake passages and wherein the second base valve portion includes one or more intake orifices, one or more compression orifices that are not arranged in fluid communication with the intake orifices, and one or more notches that are arranged in fluid communication with the intake orifices and the compression orifices.

2. The damper of claim 1, wherein the intake passages in the first base valve portion are arranged in fluid communication with the intake orifices in the second base valve portion to define an intake passageway through the base valve assembly and wherein the channels in the first base valve portion are arranged in fluid communication with the compression orifices in the second base valve portion to define a compression passageway through the base valve assembly.

3. The damper as set forth in claim 2, wherein the sleeve of the hydraulic compression stop assembly is positioned concentrically within the pressure tube such that an annular channel is defined radially between the sleeve and the pressure tube.

4. The damper of claim 3, wherein the base valve assembly includes an intake valve that is mounted on the first base valve portion and is constructed as a one-way valve that permits fluid to flow in only one direction into the sleeve cavity through the intake passageway in the base valve assembly and wherein the base valve assembly includes a compression valve that is mounted on the second base valve portion and is constructed as a one-way valve that permits fluid to flow in only one direction out of the annular channel through the compression passageway in the base valve assembly.

5. The damper of claim 4, wherein the intake valve includes a spring-disc stack that opens and closes the intake passages in the first base valve portion and wherein the compression valve includes a disc stack that opens and closed the compression orifices in the second base valve portion.

6. The damper as set forth in claim 4, further comprising:
a reserve tube extending annularly about the pressure tube to define a reservoir chamber positioned radially between the reserve tube and the pressure tube, wherein fluid flows from the reservoir chamber to the sleeve cavity via the intake passageway in the base valve assembly during a rebound stroke of the damper as permitted by the intake valve, and wherein fluid flows from the annular channel between the sleeve and the pressure tube to the reservoir chamber via the compression passageway in the base valve assembly during a compression stroke of the damper as permitted by the compression valve.

7. The damper of claim 2, wherein the compression orifices in the second base valve portion are positioned radially inward of the intake orifices in the second base valve portion.

8. The damper of claim 2, wherein the first and second base valve portions are separate parts that are held together by a pin.

* * * * *